(12) United States Patent
Fujishiro et al.

(10) Patent No.: US 11,096,236 B2
(45) Date of Patent: Aug. 17, 2021

(54) BASE STATION, ENTITY AND METHOD

(71) Applicant: KYOCERA CORPORATION, Kyoto (JP)

(72) Inventors: Masato Fujishiro, Yokohama (JP); Mayumi Komura, Yokohama (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 16/270,738

(22) Filed: Feb. 8, 2019

(65) Prior Publication Data

US 2019/0174570 A1  Jun. 6, 2019

Related U.S. Application Data

(63) Continuation of application No. PCT/JP2017/028451, filed on Aug. 4, 2017.

(60) Provisional application No. 62/372,900, filed on Aug. 10, 2016.

(51) Int. Cl.
| | |
|---|---|
| *H04W 68/00* | (2009.01) |
| *H04W 76/27* | (2018.01) |
| *H04W 76/00* | (2018.01) |
| *H04W 92/12* | (2009.01) |
| *H04W 92/10* | (2009.01) |
| *H04W 92/14* | (2009.01) |

(52) U.S. Cl.
CPC ........... *H04W 76/27* (2018.02); *H04W 68/00* (2013.01); *H04W 76/00* (2013.01); *H04W 92/12* (2013.01); *H04W 92/10* (2013.01); *H04W 92/14* (2013.01)

(58) Field of Classification Search
CPC ..... H04W 76/27; H04W 68/00; H04W 76/00; H04W 92/12; H04W 92/10; H04W 92/14
See application file for complete search history.

(56) References Cited

U.S. PATENT DOCUMENTS

| | | | | |
|---|---|---|---|---|
| 2010/0022256 A1* | 1/2010 | Hochedez | ............. | H04W 68/00 455/458 |
| 2014/0302874 A1* | 10/2014 | Zakrzewski | .......... | H04W 76/10 455/456.1 |
| 2019/0037634 A1* | 1/2019 | Kadiri | ................. | H04W 12/003 |

FOREIGN PATENT DOCUMENTS

JP     2009-542147 A     11/2009

OTHER PUBLICATIONS

Nokia et al., Paging for light connection, 3GPP TSG RAN Working Group 2 Meeting #94, R2-163888, May 23-27, 2016, pp. 1-6, Nanjing, China.

(Continued)

*Primary Examiner* — Hashim S Bhatti
(74) *Attorney, Agent, or Firm* — Studebaker & Brackett PC

(57) ABSTRACT

A base station causes a radio terminal to transition to a specific state. The specific state is a state in which signaling for the radio terminal is suppressed compare to an RRC connected state while a connection for the radio terminal is maintained between the base station and a core network. The base station transmits to an entity of the core network, an identifier identifying the radio terminal and a first RRC transition notification indicting that the radio terminal transitions from the RRC connected state to the specific state. The base station causes the radio terminal to transition from the specific state to the RRC connected state. The base station transmits to the entity, a second RRC transition notification indicting that the radio terminal transitions from the specific state to the RRC connected state.

9 Claims, 12 Drawing Sheets

(56) References Cited

OTHER PUBLICATIONS

Nokia, Alcatel-Lucent Shanghai Bell; "Paging for light connection"; 3GPP TSG-RAN WG3 Meeting #92; R3-161352; May 23-27, 2016; 6 pages; Nanjing, China.

Intel Corporation; "Light connection DRX paging cycle and mechanism"; 3GPP TSG RAN WG2 Meeting #94; R2-163632; May 23-27, 2016; 5 pages; Nanjing, China.

Intel Corporation; "Benefits of RAN based paging"; 3GPP TSG RAN WG3 Meeting #92; R3-161082; May 23-27, 2016; total 8 pages; Nanjing, China.

3rd Generation Partnership Project; Technical Specification Group Radio Access Network; Evolved Universal Terrestrial Radio Access Network (E-UTRAN); S1 Application Protocol (S1AP); Release 13; 3GPP TS 36.413 V13.3.0; Jun. 2016; total 8 pages; 3GPP Organizational Partners.

\* cited by examiner

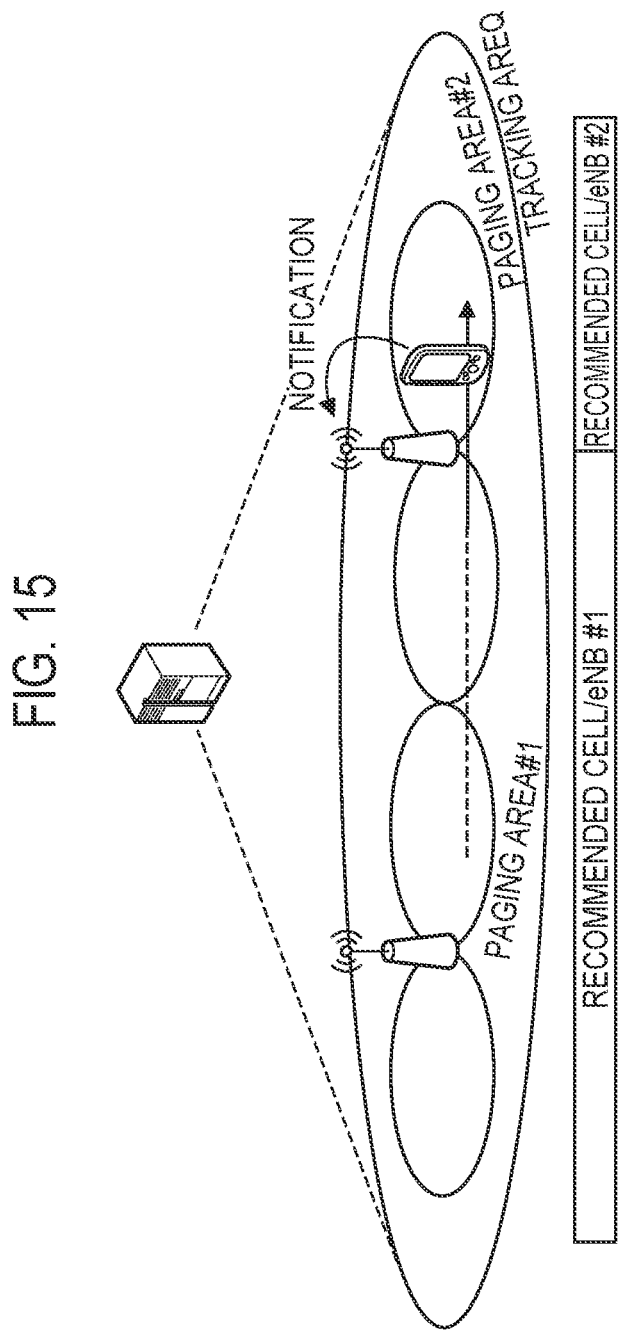

BASE STATION, ENTITY AND METHOD

CROSS-REFERENCE TO RELATED APPLICATION

The present application is a continuation based on PCT Application No. PCT/JP2017/028451 filed on Aug. 4, 2017, which claims the benefit of U.S. Provisional Application No. 62/372,900 (filed on Aug. 10, 2016). The content of which are incorporated by reference herein in their entirety.

FIELD

The present invention relates to a base station, an entity and a method used in a mobile communication system.

BACKGROUND

In recent years, with the spread of radio terminals such as smartphones capable of executing many applications, the frequency of connection of a radio terminal with a network, and the frequency of execution of paging of a radio terminal by the network are increasing.

Therefore, in a mobile communication system, the load on the network as a result of signaling is increasing. In view of such a situation, in 3GPP (3rd Generation Partnership Project) which is a project aiming to standardize a mobile communication system, the technology for reducing signaling is being examined.

SUMMARY

A base station according to a first aspect comprises a controller. The controller transmits, to a mobility management entity, a paging request for requesting execution of paging for a specific radio terminal. The specific radio terminal is a radio terminal in a specific state. The specific state is a state in which signaling for the radio terminal is suppressed while an S1 connection for the radio terminal is maintained.

A mobility management entity according to a second aspect comprises a controller. The controller receives, from a base station, a paging request for requesting execution of paging for a specific radio terminal. The controller transmits, in response to the receipt of the paging request, to the base station, a paging message addressed to the radio terminal. The specific radio terminal is a radio terminal in a specific state. The specific state is a state in which signaling for the radio terminal is suppressed while an S1 connection for the radio terminal is maintained.

A base station according to a third aspect comprises a controller. The controller causes a radio terminal to transition to a specific state. The specific state is a state in which signaling for the radio terminal is suppressed while an S1 connection for the radio terminal is maintained. The controller transmits, to the mobility management entity, a transition notification related to the radio terminal to be transitioned to the specific state.

A mobility management entity according to a fourth aspect comprises a controller. The controller receives a transition notification related to a radio terminal to be transitioned to a specific state, from a base station or the radio terminal. The specific state is a state in which signaling for the radio terminal is suppressed while an S1 connection for the radio terminal is maintained. The controller transmits, after receiving the transition notification, and in response to the necessity of transmitting downlink data or NAS signaling addressed to the radio terminal, a paging message addressed to the radio terminal, to the base station.

BRIEF DESCRIPTION OF THE DRAWINGS

FIG. 15 is a diagram illustrating a paging area and a recommended cell according to the appendix.

DESCRIPTION OF THE EMBODIMENT (Configuration of Mobile Communication System)

Figure 1:
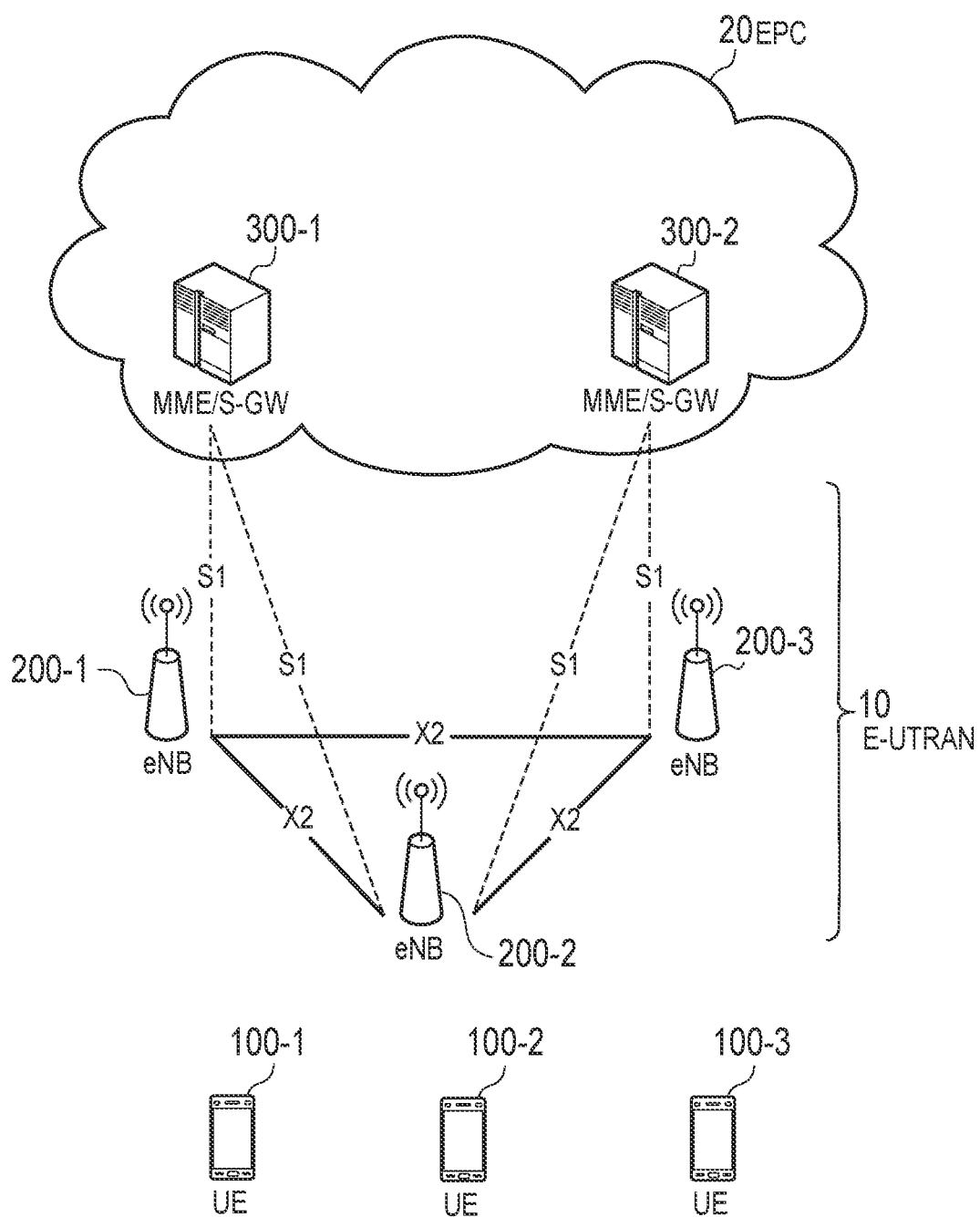
FIG. 1 is a diagram illustrating a configuration of an LTE system according to an embodiment.

Hereinafter, the configuration of the mobile communication system according to the embodiment will be described. FIG. 1 is a diagram showing a configuration of an LTE (Long Term Evolution) system which is the mobile communication system according to the embodiment. The LTE system is a mobile communication system based on the 3GPP standard.

As shown in FIG. 1, the LTE system includes a radio terminal (UE: User Equipment) 100, a radio access network (E-UTRAN: Evolved-UMTS Terrestrial Radio Access Network) 10, and a core network (Evolved Packet Core) 20.

The UE 100 is a mobile communication device. The UE 100 performs radio communication with an eNB 200 that manages a cell (serving cell) in which the UE 100 is exited.

The E-UTRAN 10 includes a plurality of base stations (eNBs: evolved Node-Bs) 200. The eNBs 200 is connected to each other via an X2 interface. The eNB 200 manages one or a plurality of cells. The eNB 200 performs radio communication with the UE 100 that establishes a connection with a cell managed by the eNB 200. The eNB 200 has a radio resource management (RRM) function, a routing function of user data (hereinafter referred to simply as "data"), a measurement control function for mobility control/scheduling, and the like. "Cell" is used as a term indicating the minimum unit of radio communication area. "Cell" is also used as a term indicating a function or resource for performing radio communication with the UE 100. Also, "cell" may belong to one frequency.

Figure 6:
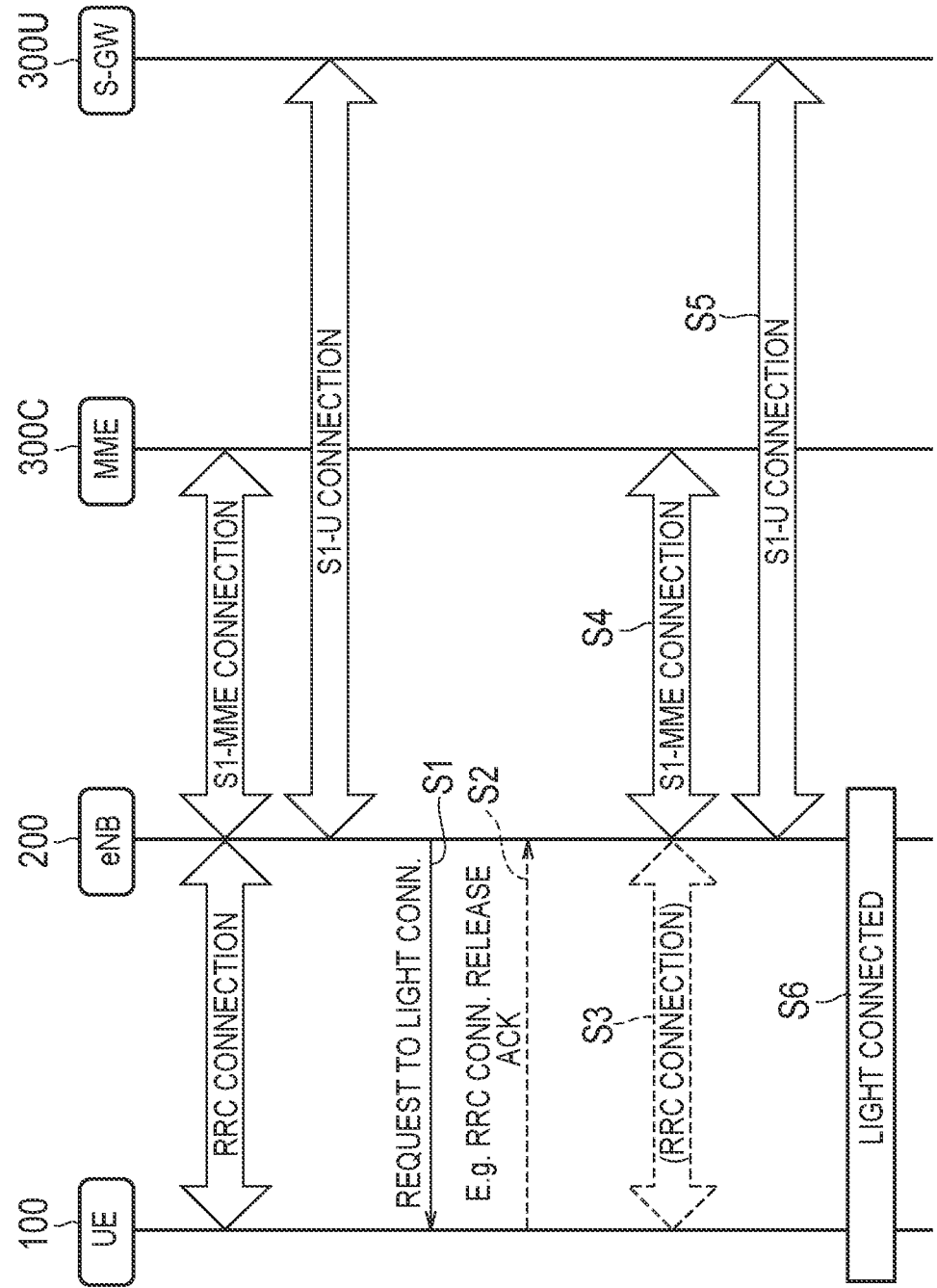
FIG. 6 is a diagram illustrating an operation concerning transition to a Light Connected state (specific state) according to the embodiment.

The EPC 20 includes a mobility management entity (MME) 300C and a serving gateway (S-GW) 300U (see FIG. 6 etc.). The MME 300 C performs various mobility control and the like for the UE 100. The MME 300C communicates with the UE 100 to manage information of the area in which the UE 100 is existed. "Area" is a tracking area composed of a plurality of cells. The MME 300C may manage the information of the area in which the UE 100 is existed in an area unit smaller than the tracking area. The S-GW 300U performs data transfer control. The MME 300C and the S-GW 300U are connected to the eNB 200 via an S1 interface.

Figure 2:
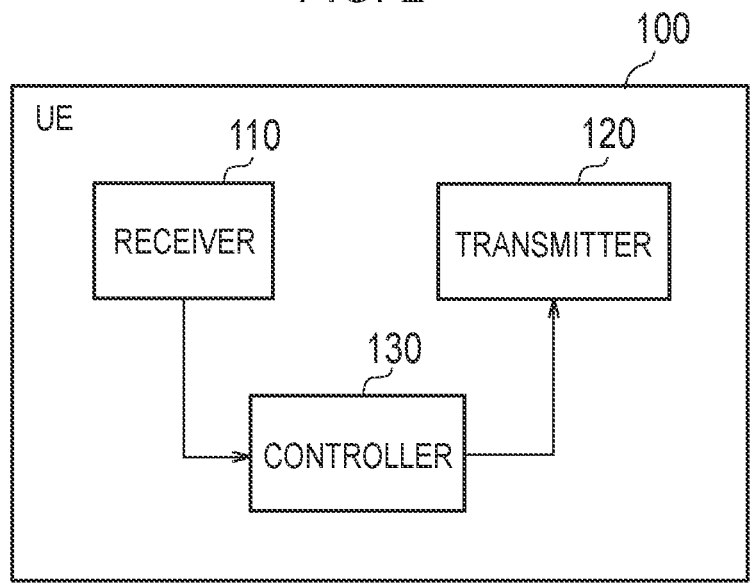
FIG. 2 is a diagram illustrating a configuration of a UE (radio terminal) according to the embodiment.

FIG. 2 is a diagram illustrating a configuration of the UE (radio terminal) according to the embodiment. As illustrated in FIG. 2, the UE 100 includes a receiver 110, a transmitter 120, and a controller 130.

The receiver 110 performs various types of reception under the control of the controller 130. The receiver 110 includes antennas and a receiving machine. The receiving machine converts the radio signal received by the antennas into a baseband signal (reception signal) and outputs it to the controller 130.

The transmitter 120 performs various transmissions under the control of the controller 130. The transmitter 120 includes antennas and a transmitting machine. The transmitting machine converts a baseband signal (transmission signal) output from the controller 130 into a radio signal and transmits it from the antennas.

The controller 130 performs various controls in the UE 100. The controller 130 includes at least one processor and memory. The memory stores programs executed by the processor and information used for processing by the processor. The processor includes a baseband processor and a CPU (Central Processing Unit). The baseband processor performs modulation and demodulation, encoding, decoding, and the like of the baseband signal. The CPU executes various processes by executing programs stored in the memory. The processor executes processes to be described later.

Figure 3:
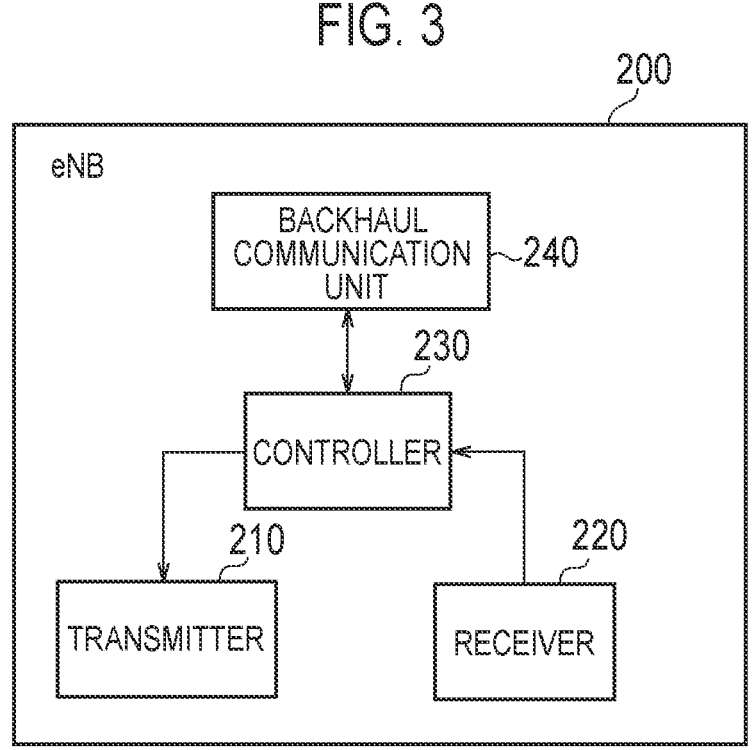
FIG. 3 is a diagram illustrating a configuration of an eNB (base station) according to the embodiment.

FIG. 3 is a diagram illustrating a configuration of an eNB (base station). As shown in FIG. 3, the eNB 200 includes a transmitter 210, a receiver 220, a controller 230, and a backhaul communication unit 240.

The transmitter 210 performs various transmissions under the control of the controller 230. The transmitter 210 includes antennas and a transmitting machine. The transmitting machine converts a baseband signal (transmission signal) outputted by the controller 230 into a radio signal and transmits it from the antennas.

The receiver 220 performs various types of reception under the control of the controller 230. The receiver 220 includes antennas and a receiving machine. The receiving machine converts the radio signal received by the antennas into a baseband signal (received signal) and outputs it to the controller 230.

The controller 230 performs various controls in the eNB 200. The controller 230 includes at least one processor and memory. The memory stores programs executed by the processor and information used for processing by the processor. The processor includes a baseband processor and a CPU. The baseband processor performs modulation and demodulation, encoding, decoding, and the like of the baseband signal. The CPU executes various processes by executing programs stored in the memory. The processor executes processes to be described later.

The backhaul communication unit 240 is connected to the neighboring eNB 200 via the X2 interface. The backhaul communication unit 240 is connected to the MME/S-GW 300 via the S1 interface. The backhaul communication unit 240 is used for communication performed on the X2 interface, communication performed on the S1 interface, and the like.

Figure 4:
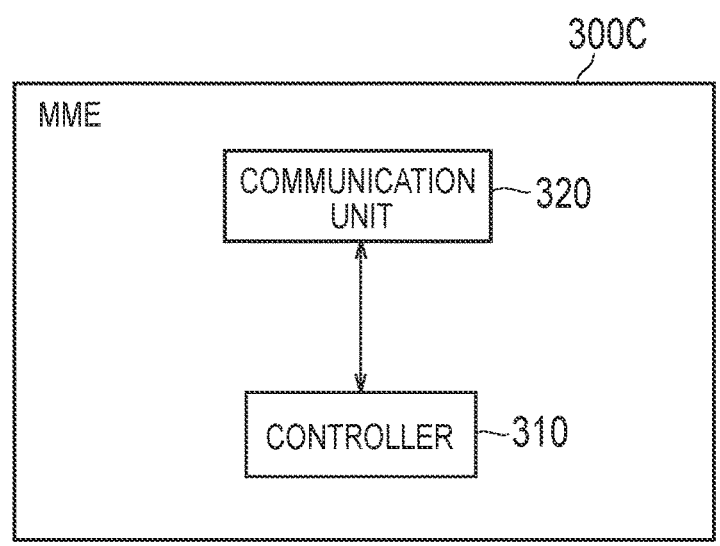
FIG. 4 is a diagram illustrating a configuration of an MME (Mobility Management Entity) according to the embodiment.

FIG. 4 is a diagram illustrating a configuration of the MME 300C. As shown in FIG. 4, the MME 300C includes a communication unit 310 and a controller 320.

The communication unit 310 is connected to the eNB 200 via the S1 interface. The communication unit 310 is connected to the S-GW 300U via the S 1 interface. The S-GW 300U is connected to the PDN gateway (P-GW) via the S5 interface. The communication unit 310 is used for communication performed on the S1 interface, communication performed on the S 11 interface, and the like.

The controller 320 performs various kinds of control in the MME 300C. The controller 320 includes at least one processor and memory. The memory stores a program executed by the processor and information used for processing by the processor. The processor may include a CPU that executes a program stored in the memory and performs various processes. The processor executes processing to be described later.

Figure 5:
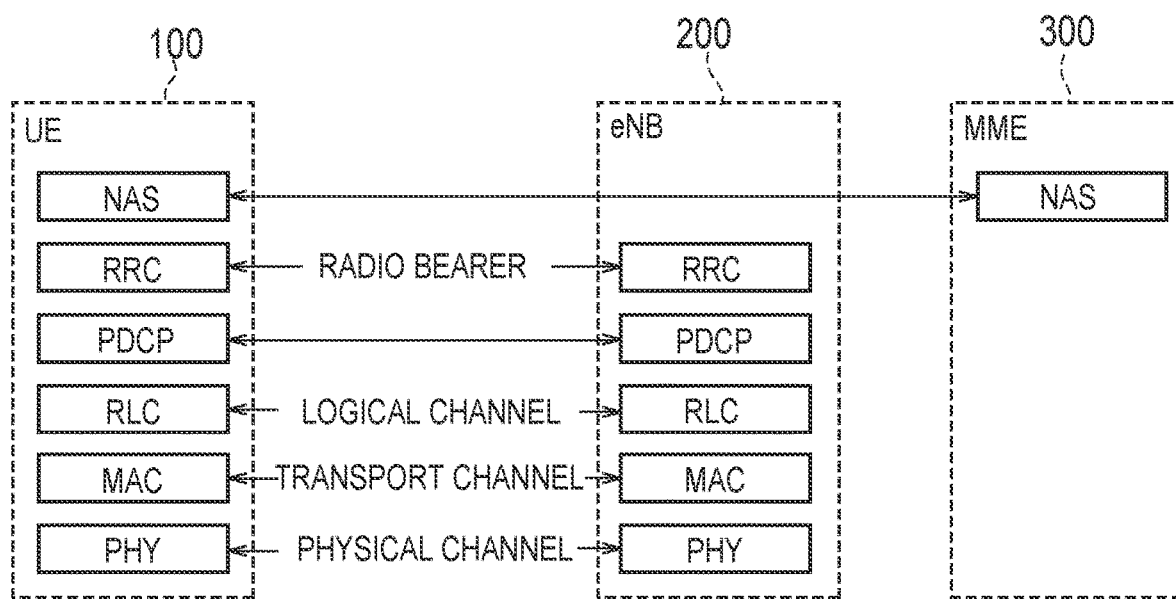
FIG. 5 is a diagram illustrating a configuration of a protocol stack of a radio interface according to the embodiment.

FIG. 5 is a diagram illustrating a configuration of a protocol stack of a radio interface in the LTE system. As shown in FIG. 5, the radio interface protocol is divided into the first layer to the third layer of the OSI reference model. The first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs coding/decoding, modulation/demodulation, antenna mapping/demapping, resource mapping/demapping. Between the physical layer of the UE 100 and the physical layer of the eNB 200, data and control information are transmitted via the physical channel.

The MAC layer performs priority control of data, retransmission process by hybrid ARQ (HARQ), random access procedure, and the like. Between the MAC layer of the UE 100 and the MAC layer of the eNB 200, data and control information are transmitted via a transport channel. The MAC layer of the eNB 200 includes a scheduler. The scheduler determines the uplink and downlink transport format (transport block size, modulation and coding scheme (MCS)) and the allocated resource block to the UE 100.

The RLC layer uses the functions of the MAC layer and the physical layer to transmit data to the RLC layer on the receiving side. Between the RLC layer of the UE 100 and the RLC layer of the eNB 200, data and control information are transmitted via logical channels.

The PDCP layer carries out header compression/decompression, encryption/decryption.

The RRC layer is defined only in the control plane handling the control information. Messages (RRC messages) for various settings is transmitted between the RRC layer of the UE 100 and the RRC layer of the eNB 200. The RRC layer controls logical channels, transport channels, and physical channels in response to establishment, re-establishment and release of radio bearers. If there is a connection (RRC connection) between the RRC of the UE 100 and the RRC of the eNB 200, the UE 100 is in the RRC connected mode. Otherwise, the UE 100 is in the RRC idle mode.

The NAS (Non-Access Stratum) layer located above the RRC layer performs session management, mobility management, and the like.

(Specific State)

A specific state according to an embodiment will be described. The specific state is a state in which signaling for a UE 100 is suppressed while an S1 connection for the UE 100 is maintained. The specific state may be one state of an RRC idle mode or one state of an RRC connected mode. Alternatively, the specific state may be an RRC idle mode or an RRC state different from the RRC idle mode. A case in which the specific state is one state of the RRC idle mode or a state similar to the RRC idle mode will be mainly assumed below. The UE 100 in a specific state is exempt from sending and receiving specific signaling to and from a network. The frequency of sending and receiving specific signaling to and from the network may be reduced for the UE 100 in a specific state.

The S1 connection is a connection established between the eNB 200 and the EPC 20 on the S1 interface. The S1 interface includes an S1-U interface for the user plane and an S1-MME interface for the control plane. The S1 connection may include an S1-U connection established between the eNB 200 and the S-GW 300U on the S1-U interface, and an S1-MME connection established between the eNB 200 and the MME 300C on the S1-C interface.

"A state in which signaling for a UE 100 is suppressed" may be read as a state in which at least some of a plurality of functions of the UE 100 have been inactivated. Here, the plurality of functions may include a function of transmitting/receiving data (user data), a function of transmitting a scheduling request (SR), a function of transmitting channel state information (CSI) (that is, CSI feedback), a function of transmitting a sounding reference signal (SRS), a carrier aggregation function, a dual connectivity function, a semi-persistent scheduling (SPS) function, a WLAN aggregation function, a radio link monitoring (RLM) function, a notification (In-device Coexistence Indication UE Assistance information, MBMS Interest Indication, Sidelink UE Information, etc.) function, an idle mode intermittent reception (DRX) function, and a WLAN interworking function using broadcast signaling. However, in the specific state, at least one of the cell reselection function, the connected mode DRX function, and the WLAN interworking function using dedicated signaling may be maintained in an activated state without being inactivated.

Such a specific state will be referred to as a "Light Connected state" below. The Light Connected state may be referred to as a Light Connected mode. Note that the Light Connected state may be a state in which the signaling is reduced as compared with the RRC connected mode while the context information of the UE 100 (UE context) is maintained in the network. The UE context includes information on various settings and capabilities etc. for the UE 100. The various settings include the settings of an AS (Access Stratum). The AS includes each of the PHY, MAC, RLC, PDCP, and RRC layers. The UE 100 can transit from the Light Connected state to the RRC connected mode (that is, the RRC connection setup) with less signaling by making use of the maintained S1 connection and UE context.

FIG. 6 is a diagram illustrating an operation concerning transition to the Light Connected state (specific state). In the initial state in FIG. 6, the UE 100 is in the RRC connected mode, and an RRC Connection is established between the UE 100 and the eNB 200. In addition, an S1-MME Connection is established between the eNB 200 and the MME 300C. An S1-U Connection is established between the eNB 200 and the S-GW 300U.

As illustrated in FIG. 6, in step S1, the eNB 200 transmits to the UE 100, a transition instruction (Request to Light Conn.) instructing a transition to the Light Connected state.

The eNB 200 may transmit a transition instruction to the UE 100 by an RRC Connection Release message. The RRC Connection Release message may include a resume identifier (Resume ID). In this case, the UE 100 notifies the eNB 200 of the resume identifier during transition from the Light Connected state to the RRC connected mode. The eNB 200 resumes the use of the UE context based on the resume identifier. If the UE 100 moves from one eNB area to another eNB area in the Light Connected state, the other eNB may, based on the resume identifier, acquire the UE context from the one eNB.

Alternatively, the eNB 200 may transmit the transition instruction to the UE 100 by an RRC Connection Reconfiguration message. The RRC Connection Reconfiguration message may include information designating the function to be inactivated.

In step S2, the UE 100 transmits, in response to the receipt of the transition instruction, an acknowledgment (Ack) message to the eNB 200. In step S3, the UE 100 releases the RRC connection. However, steps S2 and S3 are not mandatory, and steps S2 and S3 may be omitted.

In step S4, the eNB 200 and the MME 300C maintain the S1-MME connection. In step S5, the eNB 200 and the S-GW 300U maintain the S1-U connection. In addition, the eNB 200 maintains the UE context of the UE 100 without discarding.

In step S6, the UE 100 transitions to the Light Connected state.

The Light Connected state may be enabled only for a duration when a timer set to the UE 100 is in operation. In this case, the UE 100 stops the Light Connected state in response to the expiration of the timer. Alternatively, the Light Connected state may be enabled only for a duration when the UE 100 exists within a predetermined frequency. For example, a UE 100 that receives an instruction for the Light Connected state in a certain cell ends the Light Connected state in response to movement to a cell of a frequency different from the frequency to which the cell belongs.

Alternatively, the UE 100 may stop the Light Connected state in response to movement outside a predetermined area including the cell of the eNB 200. The predetermined area may be a paging area unit. The predetermined area is composed of a plurality of cells broadcasting paging simultaneously to one UE 100. The predetermined area may be an area unit narrower than the tracking area.

First Embodiment

A first embodiment will be described.

(1) Operation of eNB 200 According to First Embodiment

Figure 7:
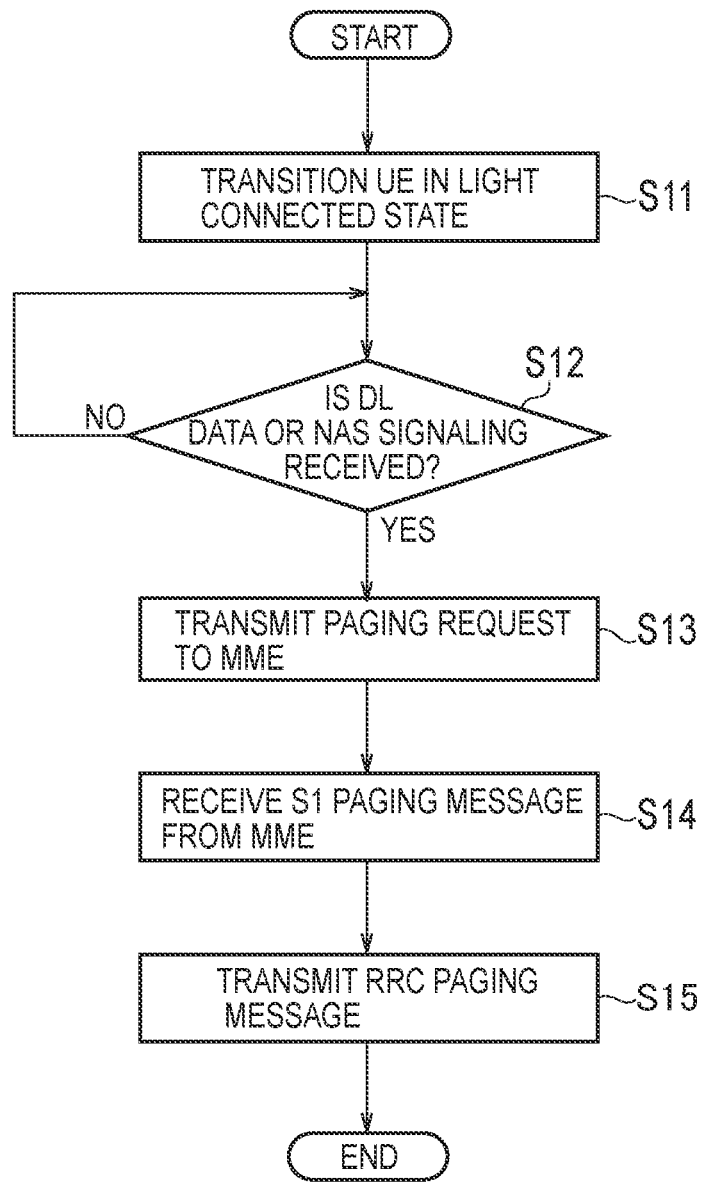
FIG. 7 is a diagram illustrating an operation of the eNB according to a first embodiment.

An operation of the eNB 200 according to the first embodiment will be described. FIG. 7 is a diagram illustrating an operation of the eNB 200 according to the first embodiment. It is noted that the signaling between the eNB 200 and the MME 300C is exchanged on the S1-MME interface.

As illustrated in FIG. 7, in step S11, the eNB 200 cause the UE 100 to transition to the Light Connected state. The UE 100 transits to the Light Connected state. Here, the UE 100 that has transited to the Light Connected state is referred to as a "specific UE 100". If the UE 100 is in the Light Connected state, the signaling for the UE 100 is reduced while the S1 connection for the UE 100 is maintained. It must be noted that the S1 connection is not maintained in the RRC idle mode. Further, in the RRC connected mode, the S1 connection is maintained, and the MME 300C can grasp the area in which the UE 100 exists, in the cell unit. On the other hand, in the case of the Light Connected state, while the S1 connection is maintained, the MME 300C grasps the area in which the UE 100 exits, not in the cell unit, but in the tracking area unit (or predetermined area unit).

A case in which the MME 300C grasps the area in which the UE 100 exists, in the tracking area unit will be mainly assumed below. However, the MME 300C may grasp the area in which the UE 100 exists, in a predetermined area unit.

In step S12, the eNB 200 determines whether or not downlink data (DL data) addressed to a specific UE 100 has been received from the S-GW 300U via the S1-U connection. Alternatively, the eNB 200 determines whether or not NAS signaling addressed to a specific UE 100 has been received from the MME 300C via the S1-MME connection. Here, the NAS signaling is, for example, a Detach request, an Identity request, an Activate dedicated EPS bearer context request, a Deactivate EPS bearer context request, an ESM information request, an ESM status, a Modify EPS bearer context request or the like (see 3GPP Technical Specification "TS 24.301").

If step S12 is "YES", the eNB 200 transmits a paging request to the MME 300C in step S13. The paging request is a message requesting the execution of paging for a specific UE 100. The eNB 200 includes an identifier (UE identifier) for identifying the specific UE 100, into the paging request. The UE identifier may be an MME UE S1AP (application) ID, an eNB UE S1AP (application) ID, a GTP (GPRS Tunneling Protocol) TE (Tunnel Endpoint) ID, a Resume ID, or the like. The MME UE S1AP ID is an ID (on the S1 AP) assigned by the MME 300C to one UE-specific S1-MME connection. The eNB UE S1AP ID is an ID (on the S1 AP) assigned by the eNB 200 to one UE-specific S1-MME connection. Note that the GTP TEID is the tunnel termination ID in a GTP protocol.

In step S14, the eNB 200 receives an S1 paging message (a first paging message) addressed to the specific UE 100 from the MME 300C. The "paging message addressed to the specific UE 100" means a paging message including an identifier of the specific UE 100 as a destination, and may further include an identifier of a UE 100 other than the specific UE 100 as a destination.

In step S15, the eNB 200 transmits, in response to the receipt of the S1 paging message, an RRC paging message (a second paging message) addressed to the specific UE 100. The RRC paging message includes an identifier for identifying the specific UE 100. The eNB 200 may include, into the second paging message, information indicating that the paging is based on the paging request. The information may be an identifier indicating that the paging is for the UE 100 (the specific UE 100) in the Light Connected state.

(2) Operation of MME 300C According to the First Embodiment

Figure 8:
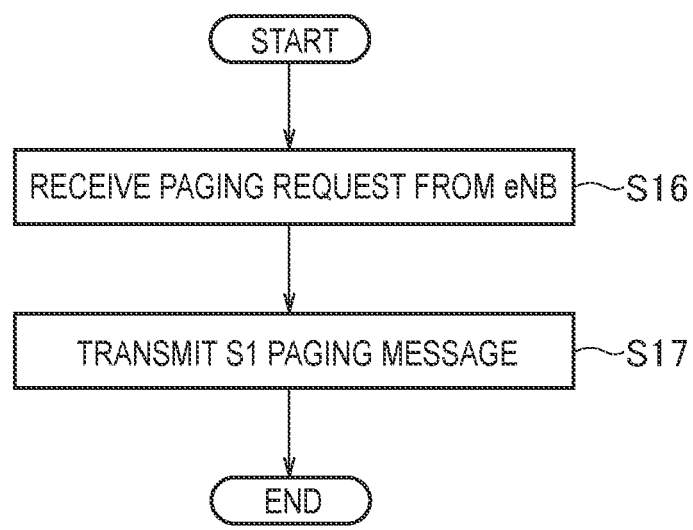
FIG. 8 is a diagram illustrating an operation of the MME according to the first embodiment.

An operation of the MME 300C according to the first embodiment will be described. FIG. 8 is a diagram illustrating an operation of the MME 300C according to the first embodiment.

As illustrated in FIG. 8, in step S16, the MME 300C receives a paging request from the eNB 200. The MME 300C, based on the UE identifier included in the paging request, determines the tracking area in which the specific UE 100 exists (that is, the registered tracking area).

In step S17, the MME 300C transmits an S1 paging message to the eNB 200 belonging to the registered tracking area. The eNB 200 belonging to the registered tracking area is one or more eNBs 200 managing cells included in the registered tracking area. The S1 paging message includes an identifier for identifying the specific UE 100 (the UE identifier).

(3) Overall Operation Example of LTE System According to First Embodiment

Figure 9:
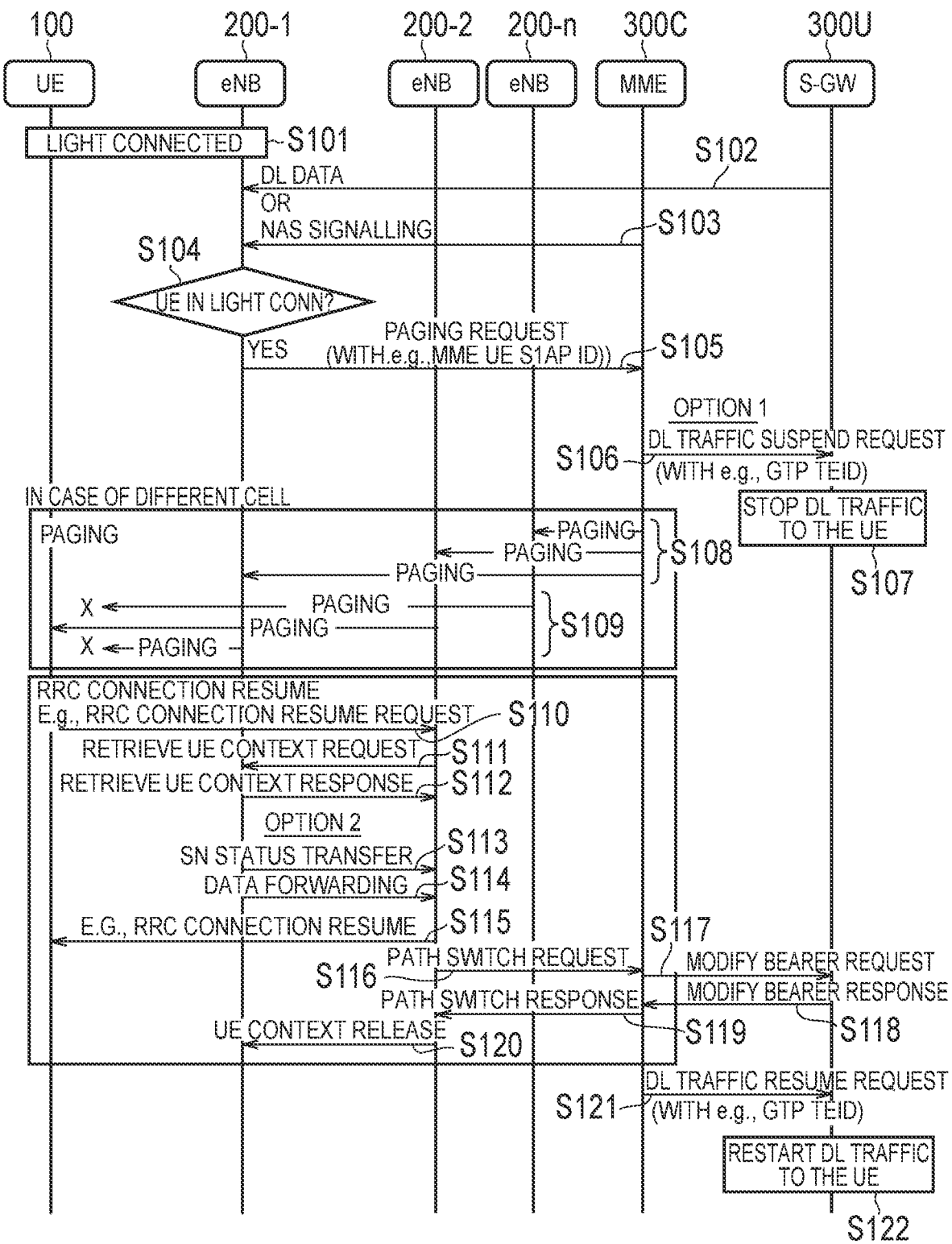
FIG. 9 is a diagram illustrating an overall operation example of an LTE system according to the first embodiment.

An overall operation example of an LTE system according to the first embodiment will be described. FIG. 9 is a diagram illustrating an overall operation example of the LTE system according to the first embodiment. The eNBs 200-1 to 200-n illustrated in FIG. 9 are eNBs 200 belonging to the same tracking area. It is noted that in FIG. 9, a case in which after transiting to the Light Connected state, the UE 100 moves to another cell (a different cell) is assumed.

As illustrated in FIG. 9, in step S101, the eNB 200-1 causes the UE 100 to transition to the Light Connected state. For example, the eNB 200-1 causes the UE 100 to transition to the Light Connected state by transmitting an RRC Connection Release message to the UE 100. The RRC connection release message may include an identifier (Resume ID) used for RRC Connection Resume.

In step S102, the eNB 200-1 receives the DL data addressed to the specific UE 100 from the S-GW 300U via the S1-U connection.

Alternatively, in step S103, the eNB 200-1 receives NAS signaling addressed to the specific UE 100 from the MME 300C via the S1-MME connection.

In step S104, the eNB 200-1 determines, in response to the receipt of the DL data and/or the NAS signaling, whether or not the destination of the DL data and/or the UE 100 as the destination of the NAS signaling is in the Light Connected state. Such a determination is made, for example, by using the "GTP TEID" for the DL data, and the "MME UE S1AP ID" for NAS signaling. Here, the explanation will be provided by assuming a case in which the destination UE 100 is in the Light Connected state.

In step S105, the eNB 200-1 transmits a paging request to the MME 300C. The paging request includes a UE identifier. The paging request may include at least one of the communication priority information, a cell ID list (and an eNB ID list), and a Cause. The communication priority information is used to determine the priority when the MME 300C transmits the S1 paging message. The cell ID list (and the eNB ID list) is used by the MME 300C to specify the notification range (that is, a predetermined area) of the S1 paging message. The Cause is used by the MME 300C to grasp the cause of occurrence of the paging request. The MMC 300C may transmit, after receiving the paging request, a response message to the paging request, to the eNB 200-1. The MME 300C may transmit, in response to the receipt of the paging request, and further, the receipt of a paging response message (NAS signaling) from the UE 100, a response message to the eNB 200-1. Such a response message may be a message (Paging Completed) indicating the success of paging. Alternatively, the response message may be a message (Paging Failure) indicating failure of paging or the like.

Steps S106, S107, S121, and S122 are operations of an option (Option 1). If steps S113 and S114 (Option 2) described later are performed, Option 1 may be omitted. In step S106, the MME 300C transmits, in response to the receipt of the paging request, a stop request (DL traffic suspend request) to the S-GW 300U. The stop request is a message requesting tentative stopping of transfer of the DL data to the specific UE 100 (specifically, the data transfer to the eNB 200-1 connected to the S1). The stop request may include an identifier (for example, the GTP TEID) for identifying the specific UE 100.

In step S107, the S-GW 300U stops, in response to the receipt of the stop request, transferring the DL data to the specific UE 100. Specifically, the S-GW 300U, even upon receiving, from the PDN gateway (P-GW) the DL data to the specific UE 100, retains the received DL data without transferring to the eNB 200-1.

Steps S108 and S109 are a paging procedure. In step S108, the MME 300C transmits, in response to the receipt of the paging request, an S1 paging (PAGING) message to the eNBs 200-1 to 200-n belonging to the registered tracking area of the specific UE 100.

In step S109, each of the eNBs 200-1 to 200-n transmits an RRC paging (Paging) message within the local cell in response to the receipt of the S1 paging message. Here, a case in which the specific UE 100 moves to a cell of the eNB 200-1 from a cell of the eNB 200-2 after transiting to the Light Connected state in a cell of the eNB 200-1 is assumed. The specific UE 100 receives the RRC paging message in the cell of the eNB 200-2.

Steps S110 to S116, S119, and S120 are an RRC Connection Resume procedure for the UE 100 to transit from the Light Connected state to the RRC connected mode. In step S110, the UE 100 transmits, in response to the receipt of the RRC paging message, an RRC Connection Resume Request message to the eNB 200-2. The RRC Connection Resume Request message may include a Resume ID.

In step S111, the eNB 200-2 transmits, in response to the receipt of the RRC connection resume request message, a UE context request (RETRIEVE UE CONTEXT REQUEST) message to the eNB 200-1.

In step S112, the eNB 200-1 transmits, in response to the receipt of the UE context request message, a UE context response (RETRIEVE UE CONTEXT RESPONSE) message to the eNB 200-1. The UE context response includes context information of the specific UE 100 (UE context).

Steps S113 and S114 are operations of an option (Option 2). If Option 1 described above is performed, Option 2 may be omitted. However, if step S102 is performed, the operation of Option 2 is performed. If Option 1 described above is not performed, the S-GW 300U continues to transfer, to the eNB 200-1, the DL data addressed to the specific UE 100. The eNB 200-1 retains the DL data addressed to the specific UE 100. In step S113, the eNB 200-1 transmits a sequence number state transfer (SN Status Transfer) message to the eNB 200-2. In step S114, the eNB 200-1 transfers, to the eNB 200-2, the DL data addressed to the specific UE 100 (Data Forwarding).

In step S115, the eNB 200-2 transmits an RRC Connection Resume message to the specific UE 100. Thereafter, the UE 100 transits from the Light Connected state to the RRC connected mode. The UE 100 that has transited to the RRC connected mode may transmit the paging response to the MME 300C by NAS signaling. Preferably, the MME 300C does not generate a new UE context when receiving the paging response. Specifically, the MME 300C checks the presence or absence of the UE context of the UE 100 that the MME 300C already possesses. If the MMC 300C possesses the UE context, the MME 300C ignores the paging response, or performs a link process to the UE context as necessary.

In step S116, the eNB 200-2 transmits to the MME 300C, a path switch request (PATH SWITCH REQUEST) message for switching the data path (that is, the S1-U connection) from the eNB 200-1 to the eNB 200-2.

In step S117, the MME 300C transmits, in response to the receipt of the path switch request message, to the S-GW 300U, a bearer modification request (Modify Bearer Request) message for requesting modification of the bearer.

In step S118, the MME 300C transmits, in response to the receipt of the bearer modification request message, to the MME 300C, a bearer modification response (Modify Bearer Response) message.

In step S119, the MME 300C transmits, in response to the receipt of the bearer modification response message, to the eNB 200-2, a path switch response (PATH SWITCH RESPONSE) message.

In step S120, the eNB 200-2 transmits, in response to the receipt of the path switch response message, to the eNB 200-1, a UE context release (UE CONTEXT RELEASE) message requesting the release of the UE context.

In the case of Option 1, in step S121, the MME 300C may transmit a DL data transfer resume request (DL traffic resume request) to the S-GW 300U. The resume request may include an identifier (for example, the GTP TEID) for identifying the specific UE 100. In step S122, the S-GW 300U resumes the DL data transfer in response to the receipt of the request from the MME 300C. Such a request may be implicitly performed by a Modify Bearer Request message described in step S117.

(4) Modification of Paging Procedure

In the operation illustrated in FIG. 9, the case in which the MME 300C performs paging in a tracking area unit was mainly assumed. However, the MME 300C may perform paging (special paging) in a predetermined area unit. In this case, the MME 300C transmits a special S1 paging message in step S108. The MME 300C may include the MME UE S1AP ID into the special S1 paging message. Specifically, the special paging means paging that the RAN (eNB) starts, for a UE 100 existing in a predetermined area determined by the RAN (eNB). Such a predetermined area may be referred to as a RAN paging area. Thus, the special S1 paging message performs the function of notifying the RAN that the special paging is to be performed (or may be performed).

The eNB 200 that receives the special S1 paging message can uniquely identify the specific UE 100 using this ID. The eNB 200 transmits, in response to the receipt of the special S1 paging message, a special RRC paging message to the specific UE 100. The special RRC paging message may include an identifier indicating that the paging is a different paging from the general RRC paging message. The identifier may be a flag indicating special paging, a C-RNTI (Cell Radio Network Temporary Identifier), a Resume ID, or the like.

The UE 100 that receives the special RRC paging message, transmits to the eNB 200, an RRC connection establishment request (RRC Connection Request) message, an RRC connection reestablishment request (Reestablishment) message or the like. The message may include an identifier indicating a response to special paging. The identifier may be a flag indicating special paging, a C-RNTI, a Resume ID, or the like. The eNB 200 that receives the message causes the UE 100 to transition to the RRC connected mode.

Modification of First Embodiment

A modification of the first embodiment will be described. The modification of the first embodiment relates to an operation of the eNB 200 after transmitting the paging request (paging request) to the MME 300C.

In the modification of the first embodiment, the eNB 200 starts a timer in response to the transmission of the paging request. The set value of the timer may be specified from the MME 300C, or may be set from an OAM. The eNB 200 may start the timer in response to the receipt of an acknowledgment message for the paging request from the MME 300C.

The timer defines the wait time of a predetermined response from the MME 300C or the specific UE 100. The eNB 200 stops the timer in response to the receipt of the predetermined response. The predetermined response from the MME 300C is, for example, a message indicating the success of paging (Paging Completed). The predetermined response from the specific UE 100 is an RRC connection resume message, an RRC connection establishment request message, or an RRC connection reestablishment request message. Alternatively, the response may be a message (such as an RAN Paging Response and an Activation Request) different from the existing messages. The message may include information indicating MT Data as a cause. The MT Data is an abbreviation of Mobile Terminated Data, which means that there was incoming data (that is, paging was received).

In response to the expiration of the timer without receiving the predetermined response, the eNB 200 retransmits the paging request or transmits the context release request to the MME 300C. The MME 300C retransmits, in response to the receipt of the paging request, the S1 paging message addressed to the specific UE 100. The MME 300C releases, in response to the receipt of the context release request, the UE context of the specific UE 100.

The paging request to be retransmitted may include information indicating that there is no paging response (Paging not responded), as a cause. The paging request to be retransmitted may include a cell ID list (and an eNB ID list). The range of the cell ID list (and the eNB ID list) may be enlarged than the cell ID list (and the eNB ID list) included in the initially-transmitted paging request. Alternatively, the paging request to be retransmitted may not include the cell ID list (and the eNB ID list). In this case, the MME 300C performs paging in the tracking area unit rather than a predetermined area unit.

Second Embodiment

A second embodiment will be described. However, differences from the first embodiment will be mainly described and a redundant description will be omitted.

(1) Operation of eNB 200 According to Second Embodiment

Figure 10:
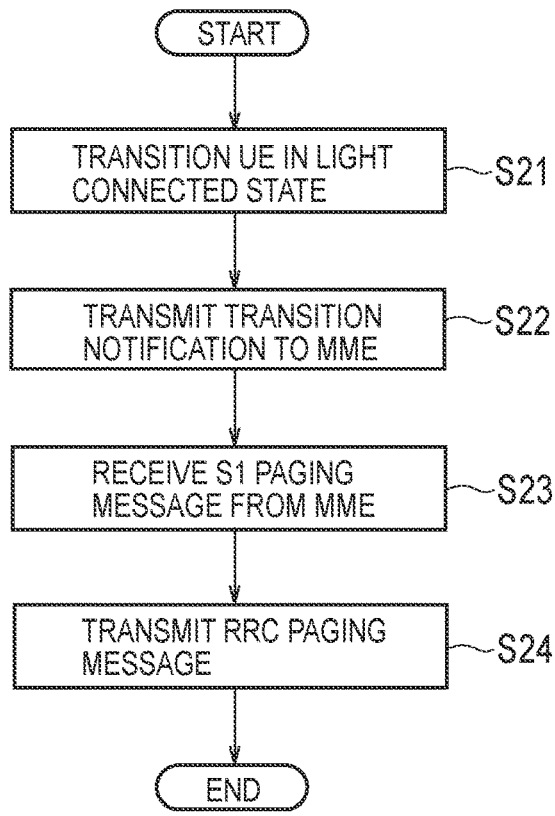
FIG. 10 is a diagram illustrating an operation of the eNB according to a second embodiment.

Next, an operation of the eNB 200 according to the second embodiment will be described. FIG. 10 is a diagram illustrating an operation of the eNB 200 according to the second embodiment.

As illustrated in FIG. 10, in step S21, the eNB 200 cause the UE 100 to transition to the Light Connected state. The UE 100 transits to the Light Connected state.

In step S22, the eNB 200 transmits, to the MME 300C, a transition notification related to the UE 100 to be transitioned to the Light Connected state. The eNB 200 may transmit a transition notification to the MME 300C before cause the UE 100 to transition to the Light Connected state. The transition notification includes an identifier for identifying the UE 100 to be transitioned to the Light Connected state. It is noted that after transmitting the transition notification, the eNB 200 may transmit, to the MME 300C, a notification indicating transition from the Light Connected state when transitioning the UE 100 to a state different from the Light Connected state (for example, an RRC connected mode, an RRC idle mode, or a suspended state). The notification may be a notification indicating that the UE 100 is no longer in the Light Connected state, or may be information indicating the state/mode of the transition destination.

In step S23, the eNB 200 receives an S1 paging message (a first paging message) addressed to the specific UE 100 from the MME 300C.

In step S24, the eNB 200 transmits, in response to the receipt of the S1 paging message, an RRC paging message (a second paging message) addressed to the specific UE 100.

(2) Operation of MME 300C According to Second Embodiment

Figure 11:
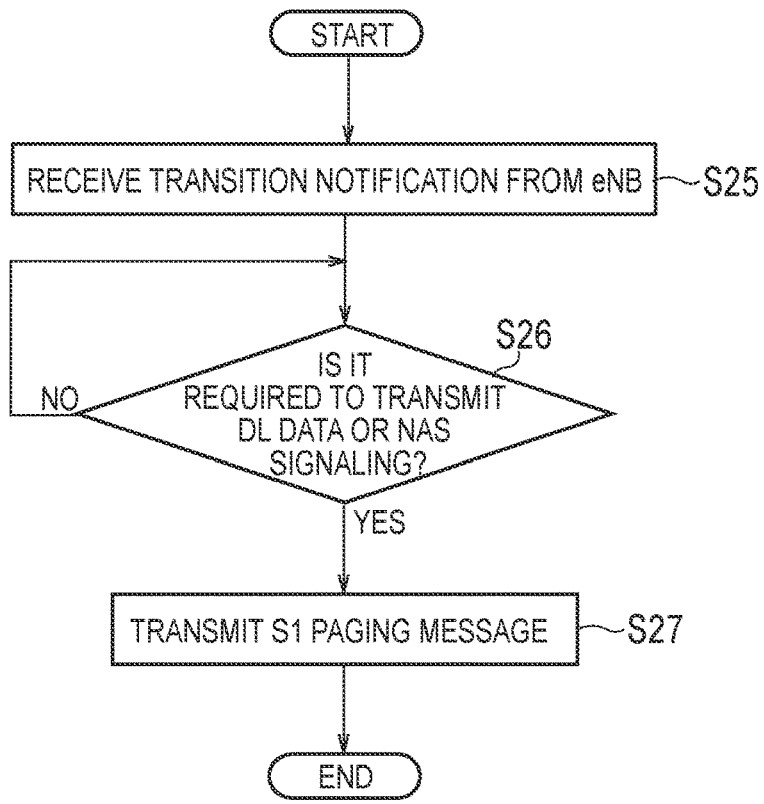
FIG. 11 is a diagram illustrating an operation of the MME according to the second embodiment.

An operation of the MME 300C according to the second embodiment will be described. FIG. 11 is a diagram illustrating an operation of the MME 300C according to the second embodiment.

As illustrated in FIG. 11, in step S25, the MME 300C receives a transition notification related to the UE 100 to be transitioned to the Light Connected state, from the eNB 200. The MME 300C may have the authority for allowing the notification (Light Connection transition). In this case, the MME 300C may transmit, to the eNB 200, a message indicating whether or not to allow the Light Connected state. Alternatively, the MME 300C may transmit, to the eNB 200, an instruction to transitioned to the RRC connected mode, the RRC idle mode, or the suspend state.

In step S26, the MME 300C determines whether or not it has become necessary to transmit DL data or NAS signaling addressed to the UE 100 (specific UE 100) that has transited to the Light Connected state. The MME 300C may, based on the notification from the S-GW 300U, determine whether or not it has become necessary to transmit the DL data addressed to the specific UE 100. In this case, the MME 300C may transmit, in response to the receipt of the transition notification, a monitoring request to the S-GW 300U. The monitoring request is a message requesting monitoring whether or not DL data addressed to the specific UE 100 is present.

If step S27 is "YES", the MME 300C, based on the UE identifier included in the transition notification, determines the registered tracking area of the specific UE 100. In step S27, the MME 300C transmits an S1 paging message to the eNB 200 belonging to the registered tracking area. The S1 paging message includes an identifier for identifying the specific UE 100 (the UE identifier).

(3) Overall Operation Example of LTE System According to Second Embodiment

Figure 12:
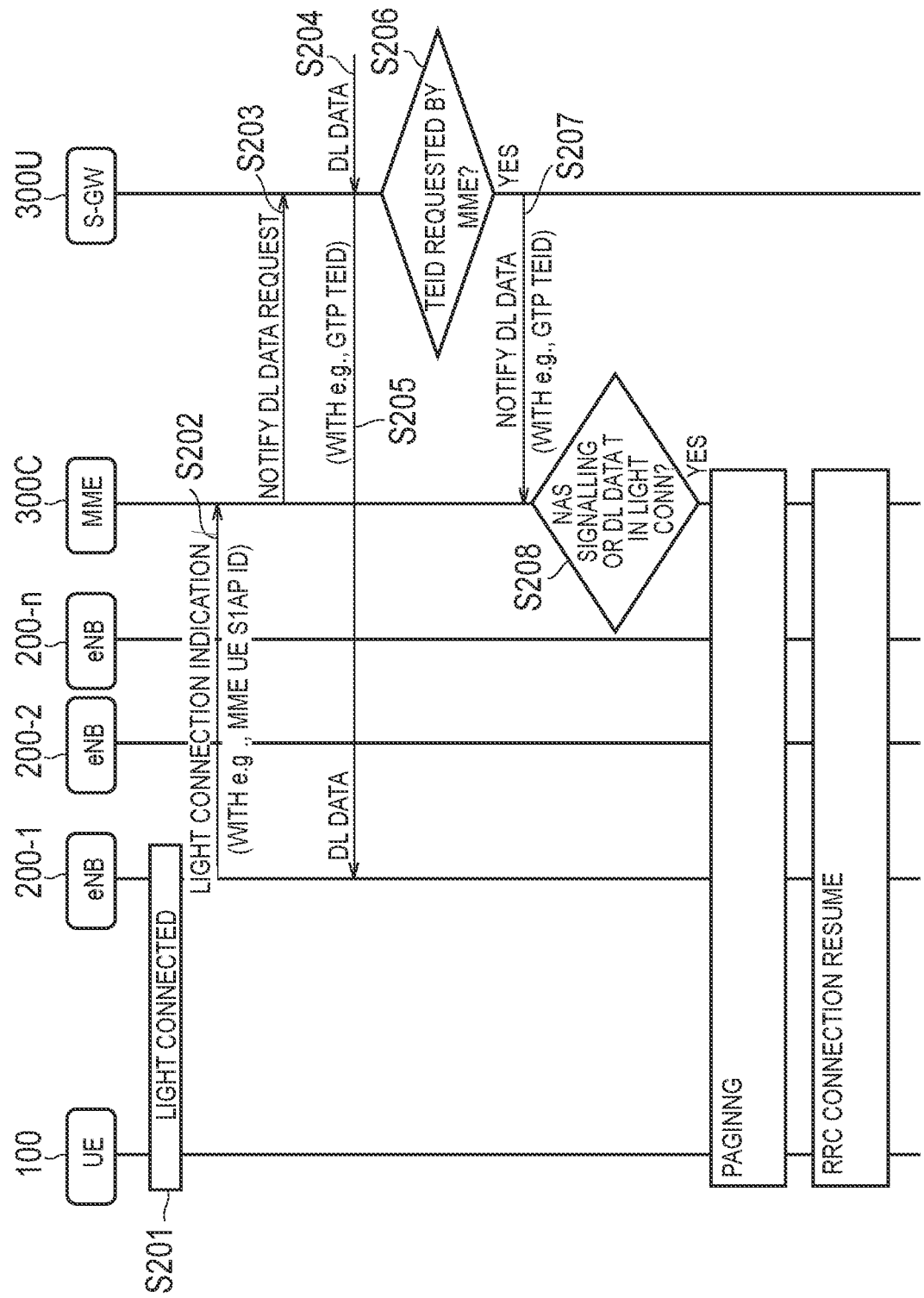
FIG. 12 is a diagram illustrating an overall operation example of an LTE system according to the second embodiment.
Figure 13:
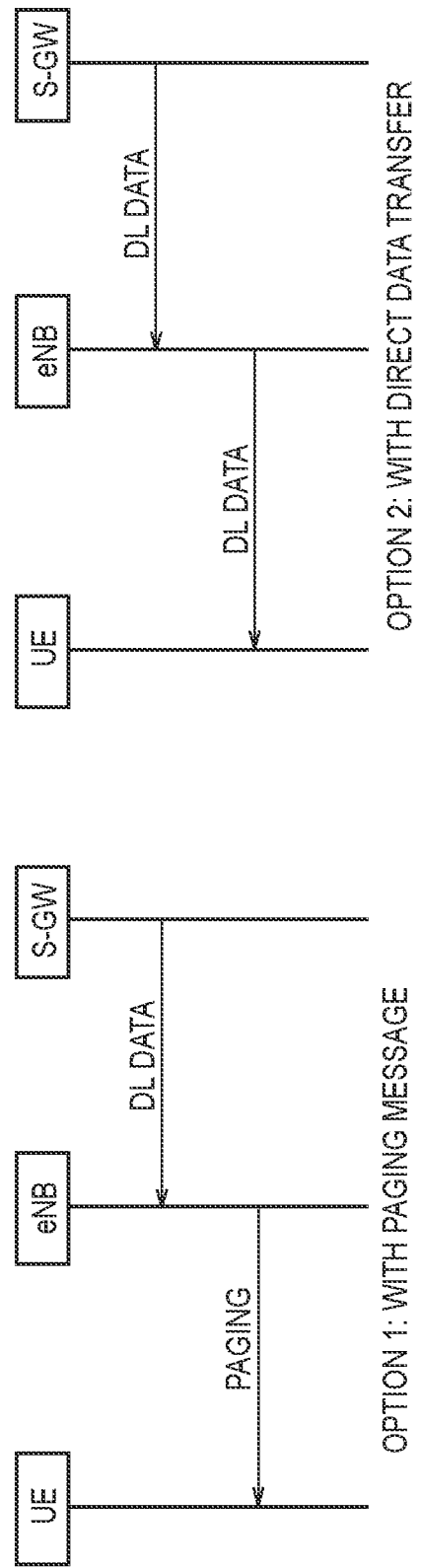
FIG. 13 is a diagram illustrating an operation of a DL transmission option of RAN control according to the appendix.
Figure 14:
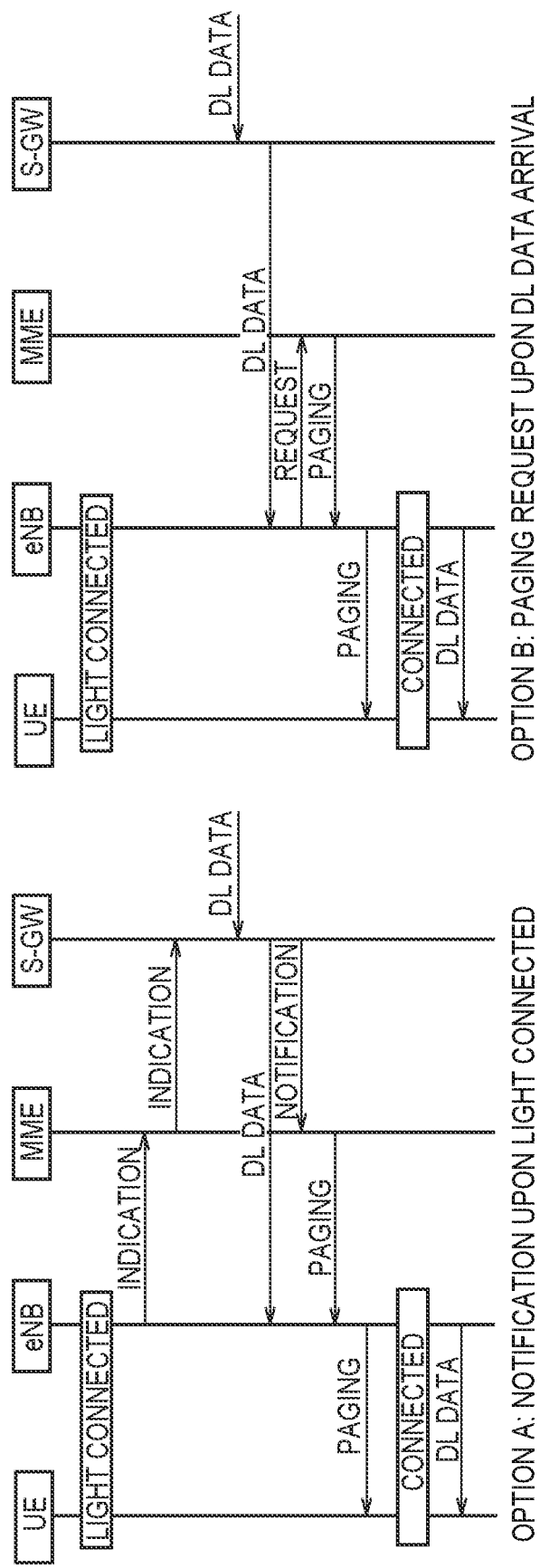
FIG. 14 is a diagram illustrating a signaling option of paging of MME start according to the appendix.

Next, an overall operation example of an LTE system according to the second embodiment will be described. FIG. 12 is a diagram illustrating an overall operation example of the LTE system according to the second embodiment. The eNBs 200-1 to 200-n illustrated in FIG. 12 are eNBs 200 belonging to the same tracking area.

As illustrated in FIG. 12, in step S201, the eNB 200-1 causes the UE 100 to transition the Light Connected state.

In step S202, the eNB 200-1 transmits, to the MME 300C, a transition notification (Light Connection Indication) related to the UE 100 to be transitioned to the Light Connected state. The transition notification includes an identifier (for example, an MME UE S1AP ID) for identifying the UE 100 (specific UE 100) to be transitioned to the Light Connected state.

In step S203, the MME 300C transmits, in response to the receipt of the transition notification, a monitoring request (Notify DL data Request) to the S-GW 300U. The monitoring request is a message requesting monitoring whether or not DL data addressed to the specific UE 100 is present. The message includes an identifier for identifying the specific UE 100 (for example, the GTP TEID). The S-GW 300U starts, in response to the receipt of the monitoring request, the monitoring of the DL data addressed to the specific UE 100. The S-GW 300U may transmit, to the MME 300C, an acknowledgment (ACK) to the monitoring request when monitoring is started.

In step S204, the S-GW 300U receives the DL data addressed to the specific UE 100 from the P-GW. The S-GW 300U may transfer, to the eNB 200-1, the DL data addressed to the specific UE 100 using an S1-U connection (step S205). Alternatively, the S-GW 300U may tentatively stop the transfer of the DL data addressed to the specific UE 100 (see Option 1 according to the first embodiment). The MME 300C may transmit, to the S-GW 300U, a monitoring request for requesting such a stop by using either the same message as the monitoring request, or a message different from the monitoring request.

Upon receiving the DL data addressed to the specific UE 100 (step S206: YES), the S-GW 300U, in step S207, transmits a notification (Notify DL data) indicating the existence of the DL data addressed to the specific UE 100 to the MME 300C.

In step S208, the MME 300C determines whether or not it has become necessary to transmit DL data or NAS signaling addressed to the specific UE 100. The MME 300C, based on the notification from the S-GW 300U, determines whether or not it has become necessary to transmit the DL data addressed to the specific UE 100.

If step S208 is "YES", the MME 300C, based on the UE identifier included in the transition notification, determines the registered tracking area of the specific UE 100, and transmits the S1 paging message to the eNB 200 belonging to the registered tracking area.

The subsequent Paging procedure and RRC Connection Resume procedure are the same as in the first embodiment.

Modification of Second Embodiment

In the second embodiment described above, an example of transmitting a transition notification (Light Connection Indication) about the Light Connected state from the eNB 200 to the MME 300C was described. However, the transition notification may be transmitted from the UE 100 to the MME 300C by NAS signaling. The UE 100 performs, in response to the receipt of the transition instruction to the Light Connection state, or the transition to the Light Connection state, a Light Connection notification to the MME 300C. Alternatively, a transition notification may be transmitted from UE 100 or the eNB 200 to the S-GW 300U or the P-GW.

Other Embodiments

The present invention is not limited only to a case where the embodiments described above may be implemented independently; but two or more embodiments may be combined and implemented. For example, a part of the configuration according to one embodiment may be added to another embodiment. Alternatively, the part of the configuration according to one embodiment may be replaced by a part of the configuration of another embodiment.

In the above-described embodiments, the LTE system is exemplified as the mobile communication system. However, the present invention is not limited to the LTE system. The present invention may be applied to a system other than the LTE system.

APPENDIX (1. Introduction)

In this appendix, the details of paging enhancement alternatives for Light Connected UEs are discussed.

(2. Discussion)

(2.1. Principle of Paging Enhancements)

(2.1.1. Issues in the Existing Paging Solutions)

Although RAN2 already identified "the RAN initiated paging is feasible and beneficial", it's useful to further discuss whether the solutions identified thus far have sufficient benefits to justify the change or if other alternatives should also be considered based on reasonable design principles.

(2.1.1.1. Paging Optimizations for Stationary or Low Mobility UEs)

Before Rel-13, paging messages were transmitted in all cells within a tracking area, regardless of whether the target UE(s) is actually located in the cell transmitting the message. In Rel-13, the paging optimizations were introduced by RAN3 and SA2 for the signalling reduction on Uu as well as S1, e.g., the Recommended Cells for Paging IE within S1 PAGING. These Rel-13 mechanisms are efficient especially for UEs with low mobility, e.g., MTC UEs, but there may be a room for further optimizations considering UEs with normal mobility, e.g., smartphones. For example, even when the MME determines from/informs the eNB of the recommended eNB/cell within S1 PAGING based on its knowledge of Information On Recommended Cells And ENBs at transition to ECM IDLE, the UE upon this MT call may have already moved outside of the recommended eNB/cell. This would result in missed pages, and the resources used for the pages are wasted.

Observation 1:

Paging optimizations introduced in Rel-13, e.g., the Recommended Cells for Paging IE within S1 PAGING, may work effectively only for stationary or low mobility UEs.

Proposal 1:

The paging enhancements should support UEs in all types of mobility conditions, not limiting to stationary or low mobility UEs.

(2.1.1.2. Deployments with Smaller Tracking Areas)

The various solutions with RAN-initiated paging mechanism were proposed in RAN2. One of the key benefits among the solutions is to limit the paging area. It indeed contributes to reduce number of paging messages in a whole network, if the RAN-initiated paging area is set to a subset of a tracking area. Similar gain may be achieved with a NW implementation today, e.g., the tracking area is configured with smaller region. But it has been pointed out that such a NW implementation will cause excessive Tracking Area Updates from UEs, whereby the overall signalling will likely increase.

Observation 2:

Although the number of paging messages can be reduced if a smaller paging area is configured, excessive Tracking Area Updates may not be preventable.

Proposal 2:

The paging enhancements should minimize the number of UL signalling due to UE mobility.

(2.1.2. Building Blocks from Agreement)

RAN2 agreed that "For the UE lightly connected, the RAN initiated paging is feasible and beneficial in terms of signalling reduction as well as decreasing latency from RAN2 perspective". It mentions the RAN-initiated paging helps with the reduction of both signalling and latency in Uu. When "S1 connection of a UE lightly connected is kept and active", the signalling of S1 PAGING is no longer needed and the latency due to S1-U connection establishment can be eliminated. However, from RAN2 perspective, it's still unclear how the RAN-initiated paging is useful for Uu signalling/latency reduction.

Observation 3:

It is unclear how the RAN-initiated paging is useful for signaling and latency reduction in the Uu link.

To make up better solution and move the discussion forward, the paging enhancements, e.g., the RAN-initiated paging, should be designed with the principles discussed in this section. So, RAN2 should first agree the design principles for the paging enhancements.

(2.2. Details of Paging Enhancements)

It could be considered some of design alternatives/options for the solution of paging enhancements, as discussed in the following sections.

(2.2.1. Alternative 1: RAN-Controlled DL Transmission)

(2.2.1.1. Paging Message or Direct Data Transfer)

With the RAN-initiated paging, the eNB may notice the necessity of paging upon arrival of DL data for the UE, without relying on S1 PAGING. The working assumption mentions "Light connected UE can be addressed only by the trigger of paging initiated by eNB or MME", which suggests some sort of paging message is sent to the UE but the details are yet to be discussed. From the U-plane's point of view, the difference between legacy paging (MME-initiated) and the new paging (eNB-initiated) is based on whether the DL data is still in the S-GW or has already arrived in the eNB, i.e., the routing in the CN is already done while S1 connection is kept and active. So, it would be worth considering whether the paging message is really necessary in this case, and the following options could be considered when the eNB receives DL data for a Light Connected UE;

Option 1:

The eNB sends the (RAN-level) paging message to the UE.

This option is based on the assumptions that upon DL data arrival, the eNB sends a paging message to the UE, and the paging message may be similar to or can even reuse the existing Paging from Uu's point of view. However, it's not crystal clear RAN-level paging is "beneficial in terms of signalling reduction as well as decreasing latency" in Uu.

Option 2:

The eNB send the DL data directly to the UE, without any paging message.

With Option 2, paging messages are not needed over the Uu link. For example, if the eNB sends the DL data immediately to the UE without sending a page. Although this may mean the DL data need to be send initially on more than one cell, the DL data volume can be managed efficiently such that the differences in the excess DL data send over multiple cells may be comparable to the amount of data needed for paging messages. The amount of signalling messages may be reduced by sending the DL data over the intended paging occasion(s), to minimize the power consumption of UEs, similar to the existing DRX. The main benefit of this option is the reduction in latency of sending the DL data due to the RTT of the paging procedure, e.g., Paging and RRC Connection Request. The details should be further discussed and may be related to how to Light Connected is defined, including mobility aspects (UE-based or NW-based).

Proposal 3:

Upon DL data arrival at the eNB, RAN2 should discuss whether the UE should be first paged (Option 1) or if direct DL data transmission (Option 2) is preferable.

(2.2.1.2. Paging Area)

If Option 1 of the RAN-controlled DL transmission is selected, it should be further discussed if is the page is performed within a specific area, as in the existing tracking area. The specific area may be just a subset of the tracking area as it's assumed to be group of cells, i.e., the paging area concept already proposed in. It's straight forward to introduce such a concept to minimize paging failure. The paging area may be depend on the availability of X2 connectivity for the UE context fetch, mobility state of the UE, spectral efficiency and so on, but this is mostly up to NW implementation.

Proposal 4:

RAN2 should introduce the paging area, which consists of a group of cells to send a transmission to page the UE.

It may be assumed that the UE mobility is transparent to the eNB as long as the UE is within the paging area. On the other hand, it should be discussed how the UE behaves when it moves outside of the paging area. To have a reliable paging procedure, there should be a mechanism for the UE to inform the serving cell of its exit condition, much like the existing Tracking Area Update mechanism. It's FFS whether the information is provided before the reselection of an outside cell or after it happens.

Proposal 5:

RAN2 should discuss whether the UE should inform the serving cell when it moves outside of the paging area.

(2.2.2. Alternative 2: MME-Controlled Paging)

Since it isn't clear whether RAN3 will accept RAN2's perspective that RAN initiated paging may be adopted, it's still possible the paging to the UE in Light Connected will need to be initiated by the MME, since the MME has in general the responsibility of mobility management (MM). Assuming the MME still needs to make the final decision, the following options may be considered;

Option A:

The eNB informs the MME when the UE transitions to Light Connected.

The eNB and the MME are able to synchronize their knowledge of whether the UE is in Light Connected or not. Furthermore, it may be beneficial to include an update procedure for synchronization of the recommended eNB/cell, e.g., if the tracking area-level paging should be avoided considering UE mobility as discussed in section 2.1.1.

Option B:

The eNB sends a "paging request" to the MME when DL data to the UE in Light Connected arrives.

With this option, the eNB only sends an indication to the MME when the paging is necessary. In other words, the frequent indications in Option A, i.e., IDLE←→Light Connected←→Connected messaging may be avoided. It may also prevent the potential CN impacts between the MME and the S-GW. As in the case for Option A, the paging request may contain the recommended eNB/cell, similar to the paging optimization in Rel-13, in order to assist the MME in limiting the scope of the S1 PAGING. However, it's questionable if it can really reduce the signalling and latency from S1's perspective.

Regardless of the options, the paging optimization [6] should be reused when the MME-initiated paging is chosen. With some enhancements as discussed above, the MME may use up-to-date information of the recommended eNB/cell when it initiates PAGING, while it's currently provided only in UE CONTEXT RELEASE COMPLETE. It could facilitate the MME to narrow down the scope of PAGING, i.e., the number of target eNBs, so it's still beneficial for signalling reduction from S1's point of view.

Observation 4:

It's still possible to have the paging enhancements on top of the paging optimizations introduced in Rel-13 if the MME-initiated paging is chosen.

From RAN2 point of view, the issues discussed in section 2.1.1 may be avoided if the eNB knows the UE's location and/or mobility status, e.g., by means of a notification from the UE upon cell reselection, whereby the recommended eNB/cell may be associated with the RAN-based paging area discussed in section 2.2.1.2. So, it's worth discussing how the eNB knows the location of the UE even in IDLE, to prevent unnecessary pages. It may be solved by the combination of the paging area, i.e., Proposal 7, and the information, i.e., Proposal 8.

Proposal 6:

Even if the MME-initiated paging is chosen, RAN2 should discuss if it's useful for the NW to know the location and/or mobility status of UEs in IDLE or Light Connected, when Rel-13 paging optimization is performed.

INDUSTRIAL APPLICABILITY

The present invention is useful in the mobile communication field.

The invention claimed is:

1. A base station comprising
a processor and a memory coupled to the processor, the processor is configured to perform processes of:
causing a radio terminal to transition to a specific state, the specific state being a state in which signaling for the radio terminal is suppressed compared to an RRC connected state while a connection for the radio terminal is maintained between the base station and a core network, the specific state being not a RRC idle state; and
transmitting to a mobility management entity, a paging request for requesting execution of paging for the radio terminal in the specific state.

2. The base station according to claim 1, wherein
the processor is configured to receive downlink data addressed to the radio terminal in the specific state from a serving gateway via the S1 connection, and
the processor is configured to transmit, in response to reception of the downlink data, the paging request to the mobility management entity.

3. The base station according to claim 2, wherein
the processor is configured to receive, from the mobility management entity, NAS signaling addressed to the radio terminal in the specific state via the S1 connection, and
the processor is configured to transmit, in response to reception of the NAS signaling, the paging request to the mobility management entity.

4. The base station according to claim 1, wherein
the processor is configured to include an identifier for identifying the radio terminal in the specific state, into the paging request.

5. The base station according to claim 1, wherein
the processor is configured to
receive, from the mobility management entity, a first paging message addressed to the radio terminal in the specific state after the transmission of the paging request, and
transmit, in response to reception of the first paging message, a second paging message addressed to the radio terminal in the specific state, wherein
the first paging message and/or the second paging message include information indicating that the paging is based on the paging request.

6. The base station according to claim 1, wherein
the processor is configured to start a timer in response to the transmission of the paging request,
the timer defines a wait time of a predetermined response from the mobility management entity or the radio terminal in the specific state, and
the processor is configured to, in response to expiration of the timer without receiving the predetermined response, retransmit the paging request or transmit a context release request to the mobility management entity.

7. A mobility management entity comprising
a processor and a memory coupled to the processor, the processor is configured to:
receive, from a base station, a paging request for requesting execution of paging for a radio terminal in a specific state, the specific state being a state in which signaling for the radio terminal is suppressed compared to an RRC connected state while a connection for the radio terminal is maintained between the base station and a core network, the specific state being not a RRC idle state, and
transmit, in response to the receipt of the paging request, to the base station, a paging message addressed to the radio terminal in the specific state.

8. The mobility management entity according to claim 7, wherein
the processor is configured to transmit, in response to reception of the paging request, to a serving gateway, a stop request for requesting tentative stopping transferring downlink data addressed to the radio terminal in the specific state.

9. The mobility management entity according to claim 7, wherein
the processor is configured to include information indicating that the paging is based on the paging request, into the paging message.

* * * * *